(12) United States Patent
Tramoni et al.

(10) Patent No.: US 11,533,081 B2
(45) Date of Patent: Dec. 20, 2022

(54) NFC DEVICE DETECTION

(71) Applicant: STMicroelectronics (Rousset) SAS, Rousset (FR)

(72) Inventors: Alexandre Tramoni, Le Beausset (FR); Pierre Rizzo, Trets (FR); Guillaume Jaunet, Grasse (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 17/229,337

(22) Filed: Apr. 13, 2021

(65) Prior Publication Data

US 2021/0328625 A1    Oct. 21, 2021

(30) Foreign Application Priority Data

Apr. 15, 2020    (FR) ...................................... 2003790

(51) Int. Cl.
| | |
|---|---|
| *H04B 5/00* | (2006.01) |
| *G06K 7/10* | (2006.01) |
| *H04B 5/02* | (2006.01) |
| *H04W 52/02* | (2009.01) |

(52) U.S. Cl.
CPC ....... *H04B 5/0031* (2013.01); *G06K 7/10128* (2013.01); *H04B 5/0056* (2013.01); *H04B 5/02* (2013.01); *H04W 52/0225* (2013.01)

(58) Field of Classification Search
CPC ...... H04B 5/0031; H04B 5/02; H04B 5/0056; H04W 52/0225; G06K 7/10128
USPC ........................................................ 455/41.1
See application file for complete search history.

(56) References Cited

U.S. PATENT DOCUMENTS

| | | | |
|---|---|---|---|
| 10,505,592 B2 | 12/2019 | Tramoni et al. | |
| 2012/0231734 A1 | 9/2012 | Symons et al. | |
| 2014/0218340 A1* | 8/2014 | Rai .......................... | G01S 17/04 250/221 |
| 2015/0095666 A1* | 4/2015 | Ananthakrishnan .... | G06F 1/206 713/300 |
| 2019/0130137 A1 | 5/2019 | Roux | |
| 2019/0181919 A1 | 6/2019 | Tramoni et al. | |

FOREIGN PATENT DOCUMENTS

EP    3495986 A1    6/2019

* cited by examiner

*Primary Examiner* — Eugene Yun
(74) *Attorney, Agent, or Firm* — Slater Matsil, LLP

(57) ABSTRACT

In accordance with an embodiment, a method includes: transmitting, by a first near-field communication (NFC) device, a field emission burst; comparing a characteristic property of a signal of the field emission burst to a detection threshold; determining a presence of a detection error based on the comparing; and adjusting the detection threshold based on a number of determined detection errors.

20 Claims, 5 Drawing Sheets

NFC DEVICE DETECTION

CROSS-REFERENCE TO RELATED APPLICATIONS

This application claims the benefit of French Patent Application No. 2003790, filed on Apr. 15, 2020, which application is hereby incorporated herein by reference in its entirety.

TECHNICAL FIELD

The present disclosure relates generally to electronic circuits, and more specifically to near-field communication (NFC) device detection.

BACKGROUND

Electromagnetic transponder communication systems are increasingly common, in particular, since the development of near-field communication technologies. These systems typically use a radio frequency electromagnetic field generated by an NFC device (terminal or reader) to detect, then communicate with another NFC device (card) located within range.

Most of the time, the current NFC devices are battery-powered. Usage periods for their functions and circuits are then generally intercut by standby periods. The standby periods in particular make it possible to decrease the energy consumption of the NFC devices. There is therefore an interest in keeping the NFC devices in standby mode for as long as possible.

SUMMARY

One embodiment provides a method in which detection thresholds, by a first NFC device, of a second NFC device, are adjusted based on a number of detection errors after several field emission bursts.

One embodiment provides a computer program product, including a non-transitory storage medium comprising instructions configured to implement the method as described.

One embodiment provides an electronic circuit, configured to implement the method as described.

According to another embodiment, the first NFC device enters a confirmation mode when at least one of the detection thresholds is crossed.

According to one embodiment, the thresholds correspond to first and second thresholds delimiting a range of values of a characteristic property of a signal across the terminals of an oscillating circuit of the first device.

According to one embodiment, said property corresponds to an amplitude of the signal across the terminals of the oscillating circuit of the first device.

According to one embodiment, said property corresponds to a phase shift of the signal across the terminals of the oscillating circuit of the first device.

According to one embodiment, the range is expanded when the number of detection errors is greater than a first value.

According to one embodiment, the range is narrowed when the number of detection errors is less than a second value.

According to one embodiment, during periodic field emission bursts by the first device, the range is offset, without scope modification, based on results obtained during one or several preceding bursts.

According to one embodiment, the offset of the range is defined by levels measured during at least one preceding burst in the absence of detection by the second device.

According to one embodiment, the first device has at least two operating modes, including a first mode in which detection bursts are spaced apart by a duration corresponding to at least one hundred times the duration of the bursts.

According to one embodiment, the first device switches to an operating mode for transmitting a polling sequence as defined in the specifications of the NFC Forum when the second device is detected within range.

One embodiment provides an electronic device, including a computer program product as described.

One embodiment provides an electronic device, including an electronic circuit as described.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the generation of the radio frequency signals and their interpretation have not been described in detail, the described embodiments and modes of implementation being compatible with the standard techniques for generating and interpreting these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Embodiments of the present disclosure relate generally to electronic circuits, and more specifically to electromagnetic transponders or electronic tags. The present description in particular applies to electronic devices incorporating a near-field communication (NFC) circuit, more commonly called NFC devices, and the detection of the presence of such a device in the field of another device. One embodiment addresses all or some of the drawbacks of the known methods and circuits for detecting the presence of an NFC device by another NFC device emitting an electromagnetic field, more particularly during standby periods of the device emitting the field of another device.

Figure 1:
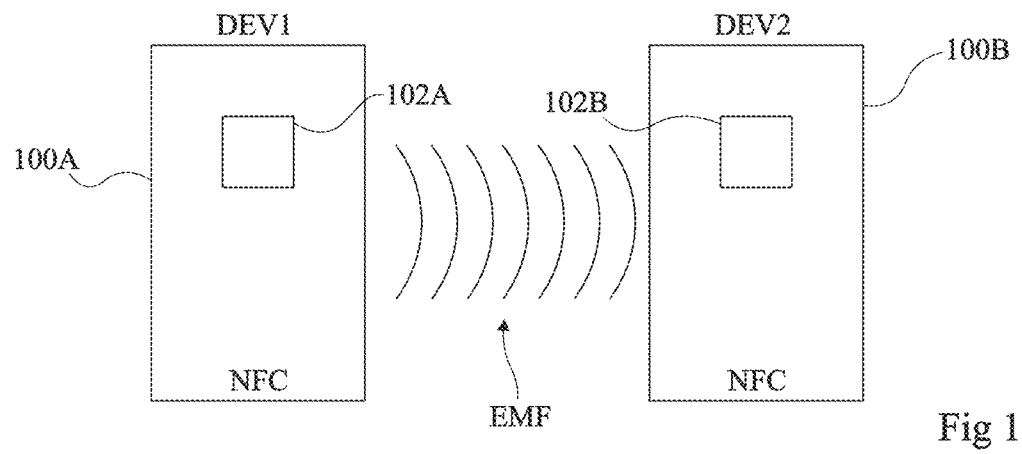
FIG. 1 shows, very schematically and in block diagram form, an exemplary near field communication system, of the type to which, as an example, the described embodiments and modes of implementation apply.

FIG. 1 shows, very schematically and in block diagram form, an exemplary near field communication system, of the type to which, as an example, the described embodiments and modes of implementation apply.

The case is arbitrarily considered of two similar electronic devices, for example two mobile telephones, but what is described applies more generally to any system in which a reader, terminal or device radiates an electromagnetic field able to be detected by a transponder. To simplify, reference will be made to NFC devices in order to designate electronic devices incorporating one or several near-field communication (NFC) circuits.

In the illustrated example, a first NFC device 100A (DEV1) is able to communicate, by near-field electromagnetic coupling, with a second NFC device 100B (DEV2). Depending on the applications, for a communication, one of the NFC devices 100A, 100B operates in so-called reader mode, while the other NFC device 100B, 100A operates in so-called card mode, or both NFC devices 100A, 100B communicate in peer-to-peer (P2P) mode.

Each NFC device 100A, 100B incorporates a near-field communication circuit symbolized, in FIG. 1, by a block 102A, 102B. The near-field communication circuits 102A and 102B each have various elements or electronic circuits for generating or detecting a radio frequency signal using an antenna (not shown), for example modulation or demodulation circuits. During a communication between the NFC devices 100A and 100B, the radio frequency signal generated by one of the NFC devices 100A, 100B is detected by the other NFC device 100B, 100A located within range.

It is arbitrarily considered, as illustrated in FIG. 1, that the first NFC device 100A emits an electromagnetic field (EMF) in order to initiate a communication with the second NFC device 100B. The field EMF is detected by the second NFC device 100B once it is within range. A coupling is then formed between two oscillating circuits, in the case at hand that of the antenna of the first NFC device 100A and that of the antenna of the second NFC device 100B. This coupling is reflected by a variation of the charge made up of the circuits of the NFC device 100B on the oscillating circuit for generating the field EMF of the NFC device 100A.

In practice, for a communication, a corresponding phase or amplitude variation of the transmitted field is detected by the device 100A, which then begins an NFC communication protocol with the device 100B. On the NFC device 100A side, in practice it is detected whether the amplitude of the voltage across the terminals of the oscillating circuit and/or the phase shift relative to the signal generated by the circuit 102A depart from the amplitude and/or phase ranges (or windows) each delimited by first and second thresholds. For example, the first threshold is below the second threshold. Reference will be made hereinafter to lower and upper thresholds.

In the case of a communication, once the NFC device 100A has detected the presence of the NFC device 100B in its field, it begins a procedure for establishing communication, implementing transmissions of the requests by the NFC device 100A and responses by the NFC device 100B (polling sequence as defined in the technical specifications of the NFC Forum). If the circuits of the NFC device 100B are in standby mode, they are then reactivated.

For energy saving reasons, the devices 100A and 100B, whether they are each connected to the electrical distribution sector or powered directly or indirectly by battery, are generally placed in standby mode when they are not used for a communication. NFC devices are thus often equipped with circuits for detecting another device located within their field (within range) in order to exit standby mode for communication purposes.

In certain applications, when an NFC device is not in the process of communicating, it is switched to so-called low power mode or standby mode in order to reduce the consumed energy. This is in particular the case for battery-powered NFC devices. In this low power mode, an NFC device configured in reading mode executes a so-called low power card detection (LPCD) mode, in which it performs detection loops.

The detection is similar to that done when the device is not in low power mode. However, in normal mode, the transmission of the carrier is continuous and periodically includes polling frames whereas, in standby mode, the transmission of the field is done by periodic bursts and without polling frame in order to reduce consumption. The bursts have a significantly shorter duration (in a ratio of at least ten, preferably at least one hundred) than the duration of a polling request of a card in normal mode.

Figure 2:
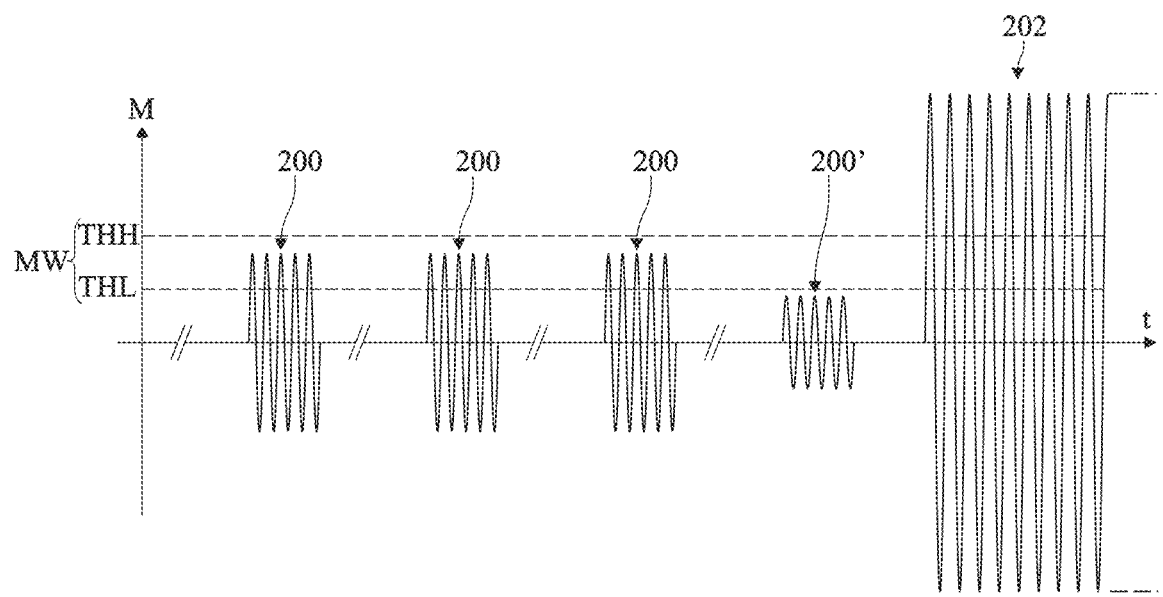
FIG. 2 is a timing diagram illustrating an exemplary method for the detection, by a device in read mode and in standby, of a device in card mode.

FIG. 2 is a timing diagram illustrating an exemplary method for the detection, by a device in read mode and in standby mode, for example the first NFC device 100A (FIG. 1), of a device in card mode, for example the second NFC device 100B (FIG. 1). FIG. 2 more specifically very schematically illustrates an exemplary appearance of the evolution, as a function of time t (on the x-axis), of a amplitude M (on the y-axis) of a signal across the terminals of the oscillating circuit of the NFC device 100A operating in reader mode.

When it is in standby mode, the NFC device 100A, seeking to detect the presence of the NFC device 100B within range, periodically emits a field burst 200. This detection burst generally only includes a carrier, typically at 13.56 MHz, without modulation, and has a relatively short duration relative to an interval between two bursts, preferably in a ratio of at least one hundred. The interval between two bursts depends on the devices, but is generally several hundred milliseconds (typically 256 ms), while the duration of a burst 200 is in the order of about ten or one hundred microseconds.

As an example, the device 100A leaves standby mode temporarily and periodically to transmit the bursts 200. In general, it is preferred, however, to use a finite-state machine to transmit bursts in low power mode. This avoids waking up a microcontroller of the device 100A and thus makes it possible to stay in standby mode.

When the device 100B is located in the field and modifies the charge of the oscillating circuit of the transmitting device 100A this results in a variation of a characteristic property of a signal across the terminals of the oscillating circuit during a corresponding burst 200'. In practice, the modification of the charge of the oscillating circuit of the transmitting device 100A results in an amplitude and/or phase variation of the signal across the terminals of the oscillating circuit during the burst 200'.

In the example of FIG. 2, it is arbitrarily presumed that the presence of the device 100B causes a drop in amplitude (burst 200'). However, the presence of the device 100B can, depending on the case, also be reflected by an increase in amplitude. The same is true for the phase shift relative to the transmitted signal.

In the illustrated example, if the variation in amplitude M is sufficient to depart from a window or range MW of amplitudes, delimited by a lower threshold THL (or low threshold) and by an upper threshold THH (or high threshold), the emitting device 100A switches directly to active mode, that is to say it leaves low power mode, and then emits normally (emission 202). Similarly, if the phase variation (not shown) is sufficient to depart from a range or window of phases, denoted PW, delimited by lower and upper thresholds, the emitting device 100A switches directly to active mode, that is to say it leaves low power mode, and then emits normally.

Thus, when a card is considered detected and the transmitting device 100A is activated, it begins to emit the field with polling frames 202 of a communication. These frames are standardized (they satisfy the technical specifications of the NFC Forum) and depend on the communication protocols supported by the reader 100A. The transmission duration of a frame is generally in the order of several milliseconds to several tens of milliseconds.

If a device configured in card mode, for example, the receiver device 100B (in card mode), is present, this device then responds according to the request of the protocol that it supports and the communication begins. When the communication is completed or when the receiving device 100B to be charged leaves the field, the emitting device 100A returns to low power mode after a certain length of time (in the order of a second) in order to reduce its consumption. It then again begins to emit periodic detection bursts 200 with no communication request.

Conversely, if no device configured in card mode is present, within range, when the device 100A is activated after having considered that it has detected a card, the communication cannot be established. The emitting device 100A for example returns to low power mode after a certain length of time (in the order of a second) in order to reduce its energy consumption. It then again begins to emit periodic detection bursts 200 with no communication request.

In the example of the method described in relation with FIG. 2, the device 100A is taken out of low power mode, that is to say, taken out of standby mode, when it believes that it detects a device in card mode within its field.

In practice, the detection, by the emitting device 100A, of a variation in the amplitude of the field or its phase can nevertheless be disrupted by many environmental factors, for example the presence of metal objects nearby, temperature conditions, etc. This can lead either to detection errors, or to an absence of detection.

In particular, if the amplitude range MW and/or the phase range PW is unsuitable, the disruptions can be the source of a large number of detection errors. This generally results in a major increase in energy consumption of the device 100A, caused by many untimely exits from standby mode. Conversely, in the case of a large number of absences of detection, this can cause a delay or an inability to establish a communication with another NFC device. Such missed detections can also harm the operation of the NFC device 100A.

To try to address these drawbacks, the current solutions consist of adapting the thresholds, for example by calibration, before the device switches to low power mode. Such a calibration of the thresholds typically consists of emitting a carrier burst and measuring the signal across the terminals of the oscillating circuit to determine an "empty" level. The detection threshold is then adapted relative to this empty situation. In general, these solutions are unsatisfactory, however, in particular in greatly disrupted environments.

Figure 3:
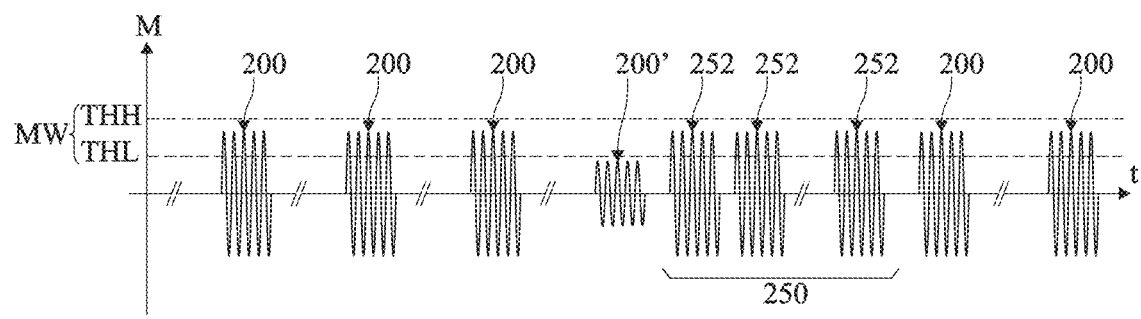
FIG. 3 is a timing diagram illustrating an embodiment of a method for the detection, by a device in read mode and in standby, of a device in card mode.

FIG. 3 is a timing diagram illustrating one embodiment of a method for the detection, by a device in read mode and in standby mode, for example the first NFC device 100A (FIG. 1), of a device in card mode, for example the second NFC device 100B (FIG. 1). FIG. 3 more specifically very schematically illustrates an exemplary appearance of the evolution, as a function of time t (on the x-axis), of a amplitude M (on the y-axis) of a signal across the terminals of the oscillating circuit of the NFC device 100A operating in reader mode.

The method of FIG. 3 comprises steps similar to those of the method of FIG. 2. These similar steps will not be described again below.

Relative to the method described in relation with FIG. 2, the embodiment illustrated in FIG. 3 provides that the emitting device 100A is not taken out of low-power mode the first time a amplitude threshold and/or a phase threshold is crossed. Relative to the example of FIG. 2, this for example amounts to not waking up the device 100A directly after the burst 200' to try to begin the emission 202.

According to this embodiment, it is provided that the finite state machine, responsible for emitting periodic bursts 200, first enters a confirmation mode 250 when the amplitude and/or the phase of one of the bursts 200 (for example, the burst 200') leaves the window MW and/or the window PW for the first time. In the confirmation mode 250, the finite state machine for example emits several field emission bursts 252, for example ten field emission bursts 252.

The bursts 252 are for example emitted by the device 100A at a frequency greater than the emission frequency of the bursts 200. As an example, the bursts 252 are emitted approximately every 1 ms, or at a frequency of about 1 kHz, versus approximately 3 to 4 Hz for the bursts 200.

It is further provided to estimate a mean amplitude and a mean phase of the ten bursts 252 emitted during the confirmation mode 250.

In the illustrated example, the mean amplitude of the bursts 252 does not leave the window MW. Supposing arbitrarily that the phase of the bursts 252 does not leave the window PW, it is considered, at the end of the confirmation mode 250, that the NFC device 100A has committed a detection error. In other words, it is concluded from this that the emission of the burst 200' was probably not due to the presence of a card within range, but for example to a disturbance. The NFC device 100A is then kept in low-power mode, and the finite state machine resumes emitting periodic bursts 200. Relative to the example of FIG. 2, this thus makes it possible to avoid an untimely exit from standby mode of the NFC device 100A caused by the burst 200'.

Conversely, in the case (not shown) where the mean amplitude and/or the mean phase of the bursts 252 depart from the window MW and/or the window PW, it is considered, at the end of the confirmation mode 250, that another NFC device configured in card mode, for example, the device 100B, is detected. In other words, it is concluded from this that the emission of the burst 200' was probably due to the presence of a card within range. At the end of the bursts 252 emitted during the confirmation mode 250, the NFC device 100A then leaves low-power mode and makes several polling requests (typically requests A, B, F, V as described in the standard polling loop of the NFC Forum standard). In other words, relative to the example illustrated in FIG. 2, this results in this case in beginning the emission 202 at the end of the confirmation mode 250, and not directly after the burst 200'.

One advantage of the embodiment described in relation with FIG. 3 is related to the fact that it makes it possible to limit, or even avoid, untimely exits from standby mode due for example to disturbances. Relative to the method described in relation with FIG. 2, the embodiment described in relation with FIG. 3 makes it possible to reduce the energy consumption of the device 100A, thus improving its autonomy.

Figure 4:
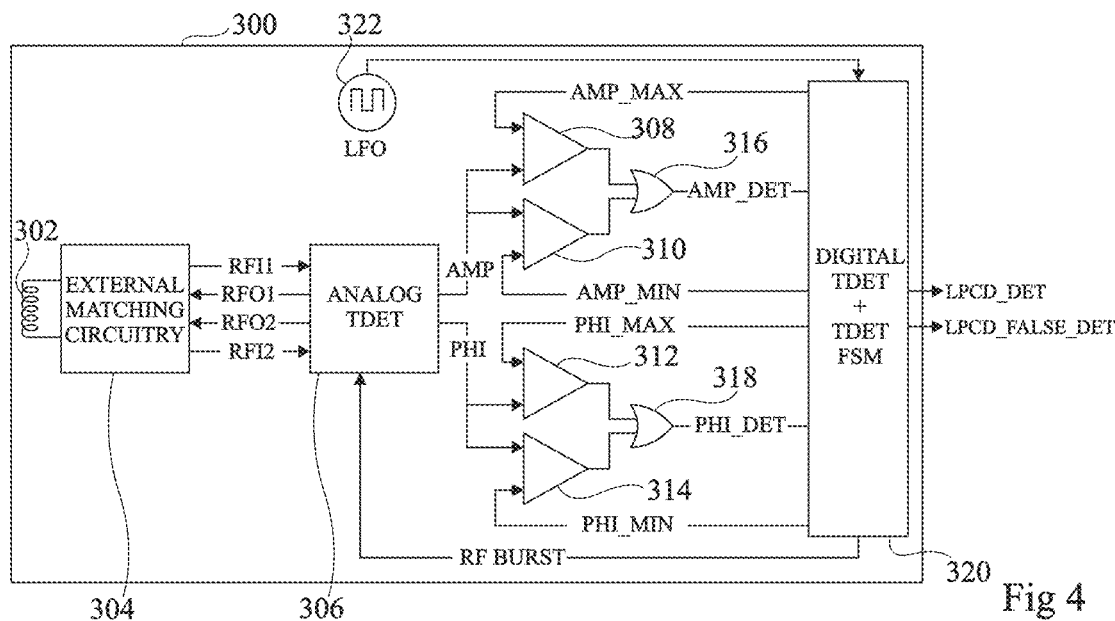
FIG. 4 shows, schematically and in block diagram form, an embodiment of a near field communication electronic circuit.

FIG. 4 shows, schematically and in block diagram form, an embodiment of a near field communication electronic circuit 300. The circuit 300 for example corresponds to all or part of the near field communication circuit 102A equipping the first NFC device 100A (FIG. 1).

The circuit 300 includes an antenna 302 symbolized, in FIG. 4, by an inductive coil. In the illustrated example, the antenna 302 is coupled or connected to an impedance adaptation circuit 304 (EXTERNAL MATCHING CIRCUITRY). The antenna 302 is associated with a capacitive element, generally parallel (for example belonging to the circuit 304), to make up an oscillating circuit.

In the illustrated example, the circuit 304 is coupled or connected to an analog circuit 306 (ANALOG TDET) for detecting NFC devices in card mode. The circuit 306 receives, from the circuit 304, signals RFI1 and RFI2 detected by the antenna 302 (generally in differential mode) and transmits to the antenna, via the circuit 304, signals to be emitted (RFO1 and RFO2). The circuit 306 generally includes a balun (balanced-unbalanced) transformer, responsible for converting differential signals into common-mode signals and vice versa. The circuit 306 also incorporates a modulator for signals to be emitted and a demodulator for received signals, as well as an amplitude/phase separator for extracting amplitude and phase variation information relative to the emitted signal.

The circuit 306 receives a carrier signal (not shown) typically at 13.56 MHz for the NFC standard. The circuit 306 also receives, from a block 320 (DIGITAL TDET+ TDET FSM) for detecting NFC devices operating in card mode, a signal RF BURST for commanding field emission bursts by the antenna 302 (corresponding to the bursts 200, FIGS. 2 and 3). The signal RF BURST is for example a binary signal, switching of which to one state (for example the high state) commands the beginning of a field emission burst and switching of which to the other state (the low state, in this example) commands the end of the field emission burst.

In reception, demodulated analog signals AMP and PHI, for example images respectively of the amplitude of the voltage across the terminals of the oscillating circuit 302 and the phase shift relative to the emitted signal, are provided by the circuit 306 to comparators 308, 310, 312 and 314. More specifically, in the illustrated example: comparator 308 compares the signal AMP to a signal AMP_MAX that is an image of a high amplitude threshold; another comparator 310 compares the signal AMP to another signal AMP_MIN that is an image of a low amplitude threshold; yet another comparator 312 compares the signal PHI to yet another signal PHI_MAX that is an image of a high phase (or phase shift) threshold; and yet another comparator 314 compares the signal PHI to yet another signal PHI_MIN that is an image of a low phase (or phase shift) threshold.

Keeping the notations introduced in relation to FIGS. 2 and 3: the signals AMP_MIN and AMP_MAX respectively correspond to the lower THL and upper THH thresholds delimiting the amplitude range MW; and the signals PHI_MIN and PHI_MAX respectively correspond to the lower and upper thresholds delimiting the phase (or phase shift) range PW.

It is assumed that the output of each comparator 308, 310, 312, 314 provides a binary (all or nothing) signal, for which: one state, for example a high state, indicates that the signal AMP, PHI is above the corresponding high threshold AMP_MAX, PHI_MAX, or below the corresponding low threshold AMP_MIN, PHI_MIN; and the other state, for example the low state, indicates that the signal AMP, PHI is both below the high threshold AMP_MAX, PHI_MAX and above the corresponding low threshold AMP_MIN, PHI_MIN.

In the circuit 300, an "OR" logic gate 316 is coupled, preferably connected, to the outputs of the comparators 308 and 310. The OR logic gate 316 supplies, as output, a binary signal AMP_DET for which: one state, for example the high state, indicates that the signal AMP is either above the high threshold AMP_MAX, or below the low threshold AMP_MIN; and the other state, in this example the low state, indicates that the signal AMP is both below the high threshold AMP_MAX and above the low threshold AMP_MIN.

Similarly, another "OR" logic gate 318 is coupled, preferably connected, to the outputs of the comparators 312 and 314. The OR logic gate 318 supplies, as output, a binary signal PHI_DET for which: one state, for example the high state, indicates that the signal PHI is either above the high threshold PHI_MAX, or below the low threshold PHI_MIN; and the other state, in this example the low state, indicates that the signal PHI is both below the high threshold PHI_MAX and above the low threshold PHI_MIN.

In other words, in this example, the signal AMP_DET, PHI_DET is in the high state when the signal AMP, PHI leaves the range MW, PW. Conversely, the signal AMP_

DET, PHI_DET is in the low state when the signal AMP, PHI stays within the range MW, PW.

Thus, when at least one of the signals AMP_DET and PHI_DET is in the high state, this means that the device 100A (FIG. 1) believes it has detected another NFC device in its field. Conversely, when the signals AMP_DET and PHI_DET are both in the low state, this means that the device 100A does not believe it has detected any NFC device in its field.

The signals AMP_DET and PHI_DET are transmitted, by the OR logic gates 316 and 318, to the detection block 320 of NFC devices operating in a card mode. In the illustrated example, the block 320 of the circuit 300 symbolizes a digital detection card for NFC devices in card mode, associated with a finite state machine (FSM). The block 320 of the circuit 300 makes it possible, for example, to execute operations associated with the management of the confirmation mode 250 previously described in relation with FIG. 3.

The block 320 of the circuit 300 transmits the signals AMP_MAX and AMP_MIN to the respective inputs of the comparators 308 and 310. Similarly, the block 320 transmits the signals PHI_MAX and PHI_MIN to the respective inputs of the comparators 312 and 314.

In the circuit 300 illustrated in FIG. 4, an oscillator 322 (LFO) transmits a synchronization or clock signal to the block 320. The oscillator 322 is for example a low-frequency oscillator (LFO) relative to the frequency (13.56 MHz) of the carrier of the emitted signals. As an example, the frequency of the oscillator 322 is in the order of several tens of kilohertz, for example equal to about 64 kHz.

During operation, it is initially assumed that the signals AMP_DET and PHI_DET are both in the low state. Switching at least one of the signals AMP_DET and PHI_DET to the high state for example causes the activation of the confirmation mode 250, leading to the emission of the bursts 252, as described in relation with FIG. 3.

In a case where, at the end of the mode 250, an NFC device and card mode is considered to have been detected within range, the device 100A is then taken out of standby mode and seeks to begin a communication with this NFC device. To that end, in the illustrated example, the block 320 transmits a binary signal LPCD_DET to other circuits (not shown) of the device 100A.

The signal LPCD_DET is for example temporarily switched from a low state to a high state each time the device 100A detects, at the end of the confirmation mode 250, another NFC device in its field. The signal LPCD_DET is for example switched from the high state to the low state each time the device 100A is placed in standby mode.

As an example, the switching to the high state of the signal LPCD_DET commands the removal of the device 100A from standby mode.

Conversely, in another case where, at the end of the mode 250, no other NFC device operating in card mode is considered to have been detected within range, the device 100A is kept in standby mode and starts to emit bursts 200 again (FIG. 3). In the illustrated example, the block 320 then transmits another binary signal LPCD_FALSE_DET to other circuits (not shown) of the device 100A.

The signal LPCD_FALSE_DET is for example temporarily switched from a low state to a high state each time the device 100A commits a detection error, in other words when the device 100A is kept in standby mode at the end of the confirmation step 250. The signal LPCD_FALSE_DET is for example switched to the low state when the first burst 200 is emitted after the exit from the confirmation mode 250.

FIGS. 5 to 11 below illustrate embodiments and modes of implementation taking advantage of the signal LPCD_FALSE_DET, for example provided by the circuit 300 of FIG. 4, in order to adjust the detection thresholds AMP_MAX, AMP_MIN and/or PHI_MAX, PHI_MIN. The embodiments and modes of implementation below are in particular described in relation with exemplary applications to the near field communication system of FIG. 1, with the understanding that one skilled in the art is capable of transposing these embodiments and modes of implementation to other near field communication systems.

Figure 5:
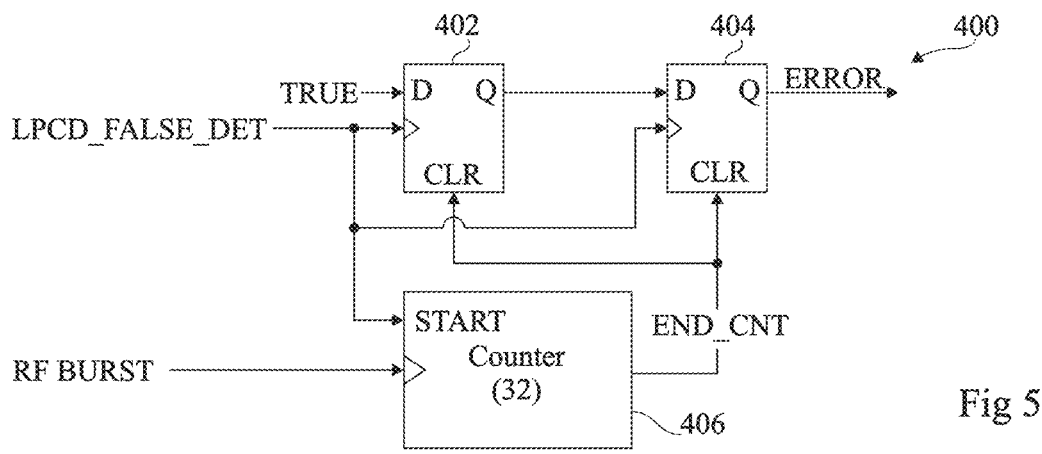
FIG. 5 shows, schematically and in block diagram form, an embodiment of a circuit configured to adjust detection thresholds of an NFC device.

FIG. 5 shows, schematically and in block diagram form, an embodiment of a circuit 400 configured to adjust detection thresholds of an NFC device. In the near field communication system of FIG. 1, the circuit 400 in particular makes it possible to adjust the detection thresholds, by the first device 100A, of the second device 100B. The circuit 400 is for example associated with the circuit 300 of FIG. 4.

The circuit 400 includes a latch 402 receiving, on a synchronization input (>), the signal LPCD_FALSE_DET (FIG. 4) and, on a data input (D), a binary signal denoted TRUE. During operation, the binary signal TRUE is for example kept in the high state.

The circuit 400 further includes another latch 404 receiving, on a synchronization input (>), the signal LPCD_FALSE_DET and, on a data input (D), a binary signal (not shown) coming from an output (Q) of the latch 402. The latch 404 supplies, as output (Q), a binary signal denoted ERROR.

The circuit 400 also includes a counter 406 (Counter (32)) of field emission bursts. The counter 406 receives, on an initialization input (START), the signal LPCD_FALSE_DET and, on another counting input (>), the signal RF BURST (FIG. 4) commanding bursts 200. In practice, the counter 406 is for example configured to count, after a first rising edge of the signal LPCD_FALSE_DET, several consecutive rising edges of the signal RF BURST, that is to say several consecutive bursts 200. In the illustrated example, the counter 406 is configured to count thirty-two consecutive rising edges of the signal RF BURST.

The counter 406 provides, as output, a binary signal denoted END_CNT, for example showing the arrival of the counter at its maximum count (selected) or, in a variant, its bit of greatest weight or its most significant bit (MSB) by dimensioning the counter with one bit more. The counter is then reset at zero and operates as an increasing monotonic counter. In a variant, the counter is reset at its maximum value and operates as a decreasing monotonic counter. The signal END_CNT switches to the high state when the counter reaches zero.

Each latch 402, 404 receives the signal END_CNT on a reset input (CLR). In the illustrated example, the binary signal END_CNT is temporarily switched to the high state, to reset the latches 402 and 404, each time thirty-two successive field emission bursts have been counted by the counter 406.

During operation, it is initially assumed that the signal LPCD_FALSE_DET is in the low state and that the counter 406 has not yet begun to count down the field emission bursts. From this initial state in which the latches 402 and 404 have outputs Q in the low state, a first detection error causes the signal LPCD_FALSE_DET to switch to the high state. The output signal Q of the latch 402 then switches to the high state and the counter 406 is initialized, that is to say, begins to count or count down the field emission bursts 200 (FIG. 3). The output Q of the latch 404 stays in the low state inasmuch as its input D is still in the low state during the rising edge of the signal LPCD_FALSE_DET. The signal LPCD_FALSE_DET is for example switched to the low state as of the first burst 200 emitted after the initialization of the counter 406.

If a second detection error is committed by the device 100A before the end of the count, by the counter 406, of the thirty-two consecutive field emission bursts 200, the signal LPCD_FALSE_DET is switched to the high state again. This then causes the transmission from the high state of the output Q of the latch 402 toward the output Q of the latch 404, and therefore to the high state of the signal ERROR.

Conversely, if no detection error is committed by the device 100A before the end of the count, the latches 402 and 404 are reset by switching to the high state of the signal END_CNT. One then returns to the initial state, where the signal LPCD_FALSE_DET as well as the outputs Q of the latches 402 and 404 are in the low state and where the counter 406 has not begun to count field emission bursts.

In general, the circuit 400 is therefore configured to switch the signal ERROR to the high state if two detection errors are separated by fewer than thirty-two consecutive field emission bursts. The remainder of the disclosure shows how it is possible to take advantage of the signal ERROR in order to adjust the detection thresholds AMP_MIN, AMP_MAX and/or PHI_MIN, PHI_MAX.

Figure 6:
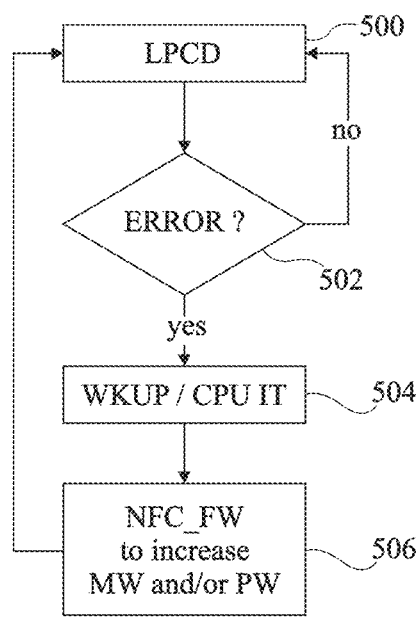
FIG. 6 shows, in block diagram form, one mode of implementation of a method for adjusting detection thresholds of an NFC device.

FIG. 6 shows, in block diagram form, one mode of implementation of a method for adjusting detection thresholds of an NFC device. The method is for example implemented by the circuit 400 (FIG. 5) equipping the first device 100A (FIG. 1).

According to this embodiment, the device 100A is, during an initial step (block 500, LPCD), configured in card detection and standby mode. From the initial step 500, the state of the binary signal ERROR is tested or observed (block 502, ERROR?) at the output Q of the latch 404 (FIG. 5).

If the signal ERROR is in the high state during step 502, one then goes (yes output of block 502) to a step (block 504, WKUP/CPU IT) for exiting standby mode. The transition from step 502 to step 504 can for example cause an interruption of a processing unit or microcontroller of the first device 100A.

From step 504 for exiting standby, one next goes to another step (block 506, NFC_FW to increase MW and/or PW). In step 506, the range MW of amplitudes and/or the range PW of phases is expanded. In other words, step 506 makes it possible to increase: a gap separating the high amplitude threshold AMP_MAX from the low amplitude threshold AMP_MIN; and/or another gap separating the high phase threshold PHI_MAX from the low phase threshold PHI_MIN.

In practice, the expansion of the range MW of amplitudes and/or the range PW of phases is for example done by software run by a microcontroller of the device 100A.

Conversely, if the signal ERROR is in the low state during step 502, one returns (no output of block 502) to the initial step 500. The range MW of amplitudes and the range PW of phases are then not modified.

One advantage of the method described in relation with FIG. 6 is related to the fact that it makes it possible to increase the expanse of the range MW of amplitudes and/or the range PW of phases as a function of the number of detection errors committed by the device 100A relative to a given number of field emission bursts (32 bursts in this example). Assuming for example that the device 100A is used in a disrupted environment, initially causing many detection errors, the implementation of the above device makes it possible to gradually adapt the detection windows so as to reduce the sensitivity of the device 100A to disturbances.

By reducing the sensitivity of the device 100A to disturbances, one in particular avoids activating the confirmation mode 250 too frequently. As a result, this makes it possible to reduce the energy consumption of the NFC device 100A, because the bursts 252 (FIG. 3) emitted during the mode 250 are more frequent than the bursts 200 emitted outside this mode. The autonomy of the device 100A is thus improved, in particular relative to a device whose detection windows are determined in the plant and are not later adaptable based on different possible usage scenarios of the device 100A.

Figure 7:
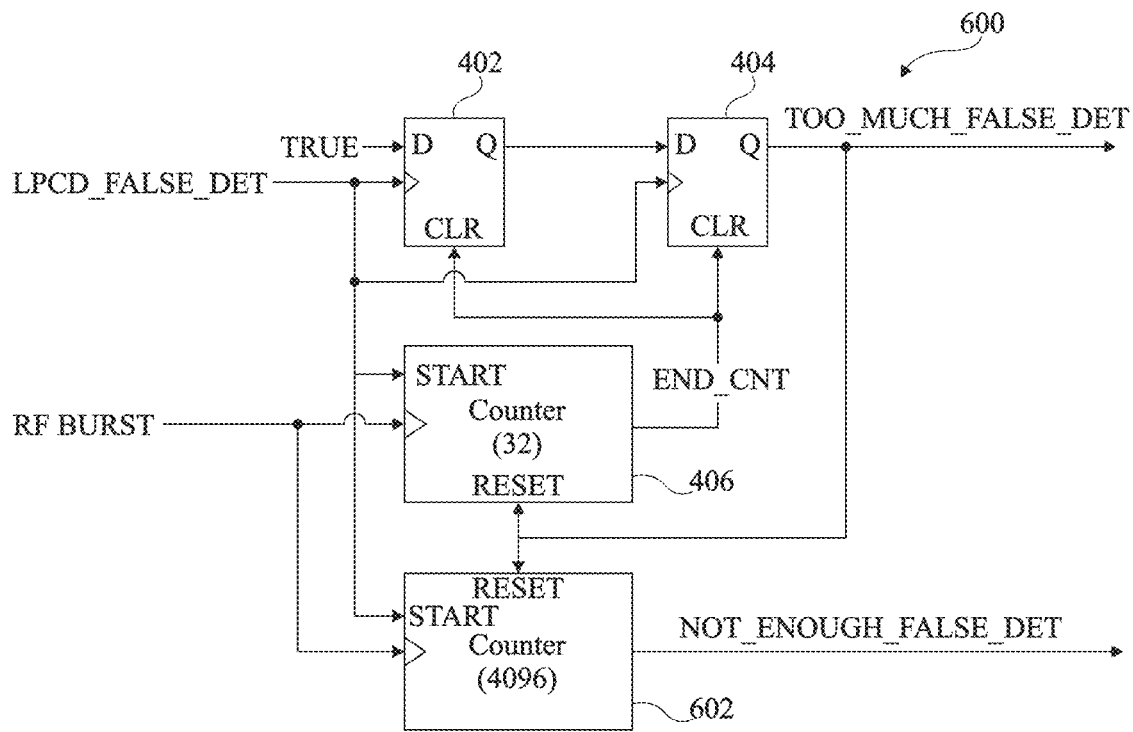
FIG. 7 shows, schematically and in block diagram form, another embodiment of a circuit configured to adjust detection thresholds of an NFC device.

FIG. 7 shows, schematically and in block diagram form, another embodiment of a circuit 600 configured to adjust detection thresholds of an NFC device. The circuit 600 of FIG. 7 has common elements with the circuit 400 of FIG. 5. These like elements will not be described again hereinafter. Only the differences between the circuit 600 of FIG. 7 and the circuit 400 of FIG. 5 will be described. The circuit 600 is for example associated with the circuit 300 of FIG. 4.

The circuit 600 of FIG. 7 differs from the circuit 400 of FIG. 5 primarily in that the circuit 600 includes another counter 602 (Counter (4096)). The counter 602 receives, on an initialization input (START), the binary signal LPCD_FALSE_DET (FIG. 4) and, on another synchronization input (>), the binary signal RF BURST (FIG. 4) commanding field emission bursts.

The counter 602 is for example configured to count, after detecting a rising edge of the signal LPCD_FALSE_DET, consecutive rising edges of the signal RF BURST, for example four thousand ninety-six (4096) consecutive rising edges of the signal RF BURST. The counter 602 provides, as output, a binary signal denoted NOT_ENOUGH_FALSE_DET, representing, like for the counter 406, depending on the initialization value, the arrival of the counter at its maximum count or at zero.

Furthermore, in the circuit 600, the latch 404 provides, as output Q, a signal denoted TOO_MUCH_FALSE_DET similar to the signal ERROR of the circuit 400 of FIG. 5. Each counter 406, 602 receives, on a reset input (RESET), the signal TOO_MUCH_FALSE_DET.

During operation, it is initially assumed that the signal LPCD_FALSE_DET is in the low state and that the counters 406 and 602 have not yet begun to count field emission bursts 200 (FIG. 3). From this initial state, in which the latches 402 and 404 have outputs Q in the low state, as well as, for example, the outputs of the counters 406 and 602, a first detection error causes the signal LPCD_FALSE_DET to switch to the high state. The output signal Q of the latch 402 then switches to the high state and the counters 406 and 602 are initialized, that is to say, begin to count or count down the field emission bursts 200. The signal LPCD_FALSE_DET is for example switched to the low state during the first burst 200 after the exit from the confirmation mode 250 (FIG. 3).

In the case where a second detection error is committed by the device 100A before the end of the count, by the counter 406, of the thirty-two consecutive field emission bursts, the signal LPCD_FALSE_DET is switched to the high state again. This then causes the high state of the signal TOO_MUCH_FALSE_DET at the output Q of the latch 404 and the reset of the counters 406 and 602.

Conversely, if the signal TOO_MUCH_FALSE_DET is not placed in the high state before the end of the countdown by the counter 602, that is to say if a single detection error takes place during the thirty-two bursts, the latches 402 and 404 are reset by the exit of the counter 406.

The counter 602 in turn continues to count or count down the bursts and the signal NOT_ENOUGH_FALSE_DET stays in the low state.

If a single detection error occurs during 4096 busts, then the signal NOT_ENOUGH_FALSE_DET at the output of the counter 602 switches to the high state.

In general, the circuit 600 is therefore configured to: switch the signal NOT_ENOUGH_FALSE_DET to the high state if, after a first detection error, no other detection error is committed during four thousand ninety-six consecutive field emission bursts 200; and switch the signal TOO_MUCH_FALSE_DET to the high state if two detection errors are separated by fewer than thirty-two consecutive field emission bursts 200 among the four thousand ninety-six emission bursts counted by the counter 602.

The remainder of the disclosure shows how it is possible to take advantage of the signals TOO_MUCH_FALSE_DET and NOT_ENOUGH_FALSE_DET in order to adjust the detection thresholds of the device 100B by the device 100A.

Figure 8:
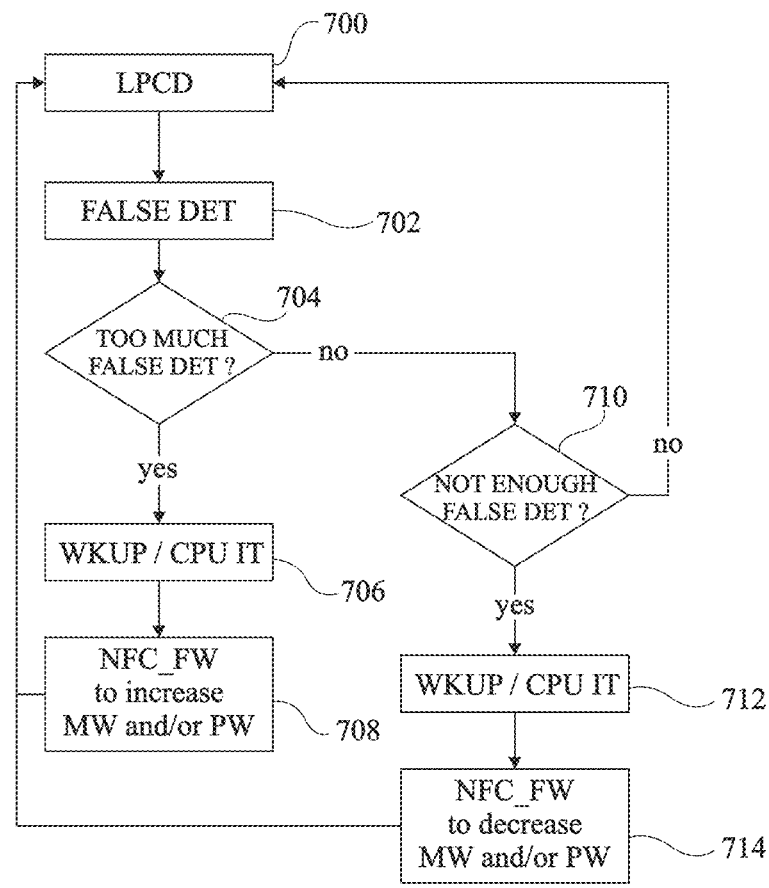
FIG. 8 shows, in block diagram form, another mode of implementation of a method for adjusting detection thresholds of an NFC device.

FIG. 8 shows, in block diagram form, another embodiment of a method for adjusting detection thresholds of an NFC device. The method is for example implemented by the circuit 600 (FIG. 7) equipping the first device 100A (FIG. 1).

According to this embodiment, the device 100A is, during an initial step (block 700, LPCD), configured in card detection and standby mode. From the initial state 700, after each detection error it is tested (block 702, FALSE DET) whether the signal TOO_MUCH_FALSE_DET is in the high state (block 704, TOO MUCH FALSE DET?).

If the signal TOO_MUCH_FALSE_DET is in the high state (yes output from block 704), one then goes to a step (block 706, WKUP/CPU IT) for exiting standby mode. Step 706 of FIG. 8 is for example similar to step 504 previously described in relation to FIG. 6. From step 706 for exiting standby, one next goes to another step (block 708, NFC_FW to increase MW and/or PW). Step 708 of FIG. 8 is for example similar to step 506 previously described in relation to FIG. 6. In particular, during step 708, the range MW of amplitudes and/or the range PW of phases is expanded.

Conversely, if the signal TOO_MUCH_FALSE_DET is in the low state (no output of block 704), it is then tested (block 710, NOT ENOUGH FALSE DET?) whether the signal NOT_ENOUGH_FALSE_DET is in the high state.

If the signal NOT_ENOUGH_FALSE_DET is in the high state (yes output from block 710), one then goes to a step (block 712, WKUP/CPU IT) for exiting standby mode. Step 712 is for example similar to step 706. From step 712 for exiting standby, one next goes to another step (block 714, NFC_FW to decrease MW and/or PW). Step 714 is for example similar to step 708, with the sole difference that, in step 714, the MW range and/or the PW range is narrowed instead of being expanded.

Conversely, if the signal NOT_ENOUGH_FALSE_DET is in the low state (no output of block 710), one returns directly to the initial step 700. In other words, as long as no signal among the signals TOO_MUCH_FALSE_DET and NOT_ENOUGH_FALSE_DET is switched to the high state, the ranges MW and PW remain unchanged.

One advantage of the method described in relation with FIG. 8 is related to the fact that it not only makes it possible to increase, but also to decrease the expanse of the range MW of amplitudes and/or the range PW of phases as a function of the number of detection errors committed by the device 100A. Relative to the method described in relation with FIG. 6, the method of FIG. 8 makes it possible to still further adapt the detection windows to the usage situations encountered by the device 100A. In particular, the method of FIG. 8 makes it possible to further optimize the energy consumption of the device 100A, for example in a case where the device 100A is used sometimes in a very disrupted environment and sometimes in a less disrupted environment.

Figure 9:
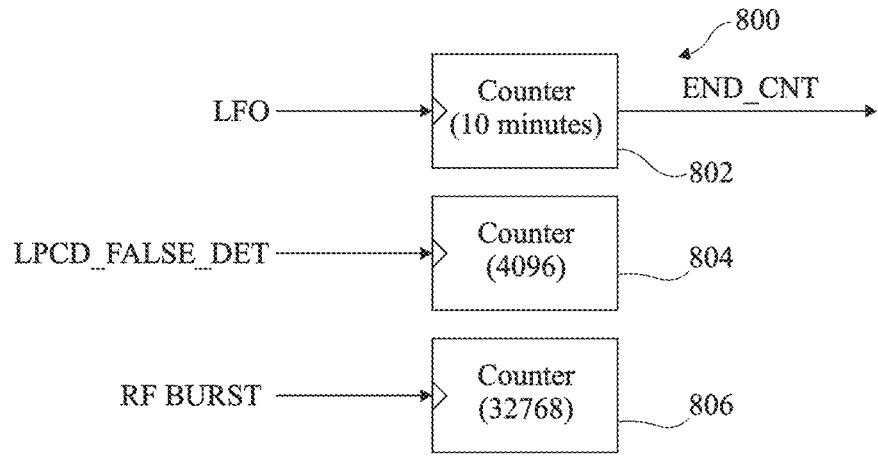
FIG. 9 shows, schematically and in block diagram form, still another embodiment of a circuit configured to adjust detection thresholds of an NFC device.

FIG. 9 shows, schematically and in block diagram form, yet another embodiment of a circuit 800 configured to adjust detection thresholds of an NFC device. The circuit 800 is for example associated with the circuit 300 of FIG. 4.

In the illustrated example, the circuit 800 includes: a first counter 802 (Counter (10 minutes)), a counting input of which (>) receives a periodic LFO signal for example coming from the low-frequency oscillator 322 (FIG. 4); a second counter 804 (Counter 4096), a counting input of which (>) receives the binary signal LPCD_FALSE_DET (FIG. 4); and a third counter 806 (Counter (32768)), a counting input of which (>) receives the signal RF BURST commanding field emission bursts.

In practice, the counter 802 is for example configured to count rising edges of the periodic signal LFO coming from the oscillator 322. The counter 802 supplies, as output, a binary signal denoted END_CNT. The counter 802 is for example configured to switch the signal END_CNT to the high state after a duration equal to about ten minutes.

The counter 804 is configured to store a number of detection errors committed by the device 100A for the duration set by the counter 802 (ten minutes in this example). In practice, the counter 804 is for example incremented by one unit upon each rising edge of the signal LPCD_FALSE_DET. In other words, the counter 804 is configured to store a number of activations of the confirmation mode 250 (FIG. 3) not having led to an exit from standby mode by the device 100A.

The counter 806 is configured to count a number of field emission bursts 200 (FIG. 3) during the duration set by the counter 802. In practice, the counter 806 is for example incremented by one unit upon each rising edge of the signal RF BURST for commanding field emission bursts 200.

In general, the circuit 800 makes it possible to establish, from information stored by the counters 804 and 806, a relationship or ratio between the number of detection errors committed by the device 100A and the number of field emission bursts 200 during the duration set by the first counter 802.

Figure 10:
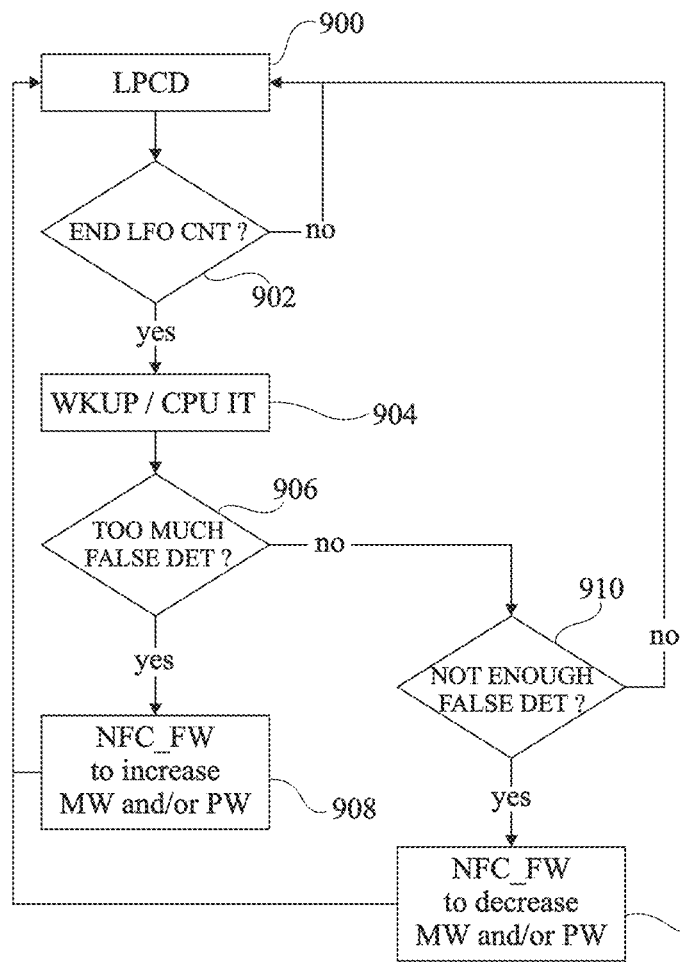
FIG. 10 shows, in block diagram form, still another mode of implementation of a method for adjusting detection thresholds of an NFC device.

FIG. 10 shows, in block diagram form, another embodiment of a method for adjusting detection thresholds of an NFC device. The method is for example implemented by the circuit 800 (FIG. 9) equipping the first device 100A (FIG. 1).

According to this embodiment, the device 100A is, during an initial step (block 900, LPCD), configured in card detection and standby mode. From the initial step 900, it is tested (block 902, END LFO CNT?) whether the signal END_CNT is in the high state, that is to say whether the duration defined by the counter 802 (FIG. 9) has elapsed.

If the signal END_CNT is in the high state (yes output from block 902), one then goes to a step (block 904, WKUP/CPU IT) for exiting standby mode. Step 904 of FIG. 8 is for example similar to step 504 previously described in relation to FIG. 6. From step 904 for leaving standby mode, the number of detection errors, stored by the counter 804, is next compared (block 906, TOO MUCH FALSE DET?) to a first value, for example a high error detection threshold.

If the number of detection errors is greater than the first value (yes output of the block 906), one next goes to another step (block 908, NFC_FW to increase MW and/or PW). Step 908 of FIG. 10 is for example similar to step 708 previously described in relation to FIG. 8. In particular, during step 908, the range MW of amplitudes and/or the range PW of phases is expanded.

Conversely, if the number of detection errors is less than the first value (no output of the block 906), the number of detection errors is then compared (block 910, NOT ENOUGH FALSE DET?) to a second value, for example a low error detection threshold.

If the number of detection errors is less than the second value, one then goes to a step (block 912, NFC_FW to decrease MW and/or PW). Step 912 is for example similar to step 908, with the sole difference that, in step 912, the MW range and/or the PW range is narrowed instead of being expanded.

Conversely, if the number of detection errors is greater than the second value and less than the first value (no output of block 910), one returns directly to the initial step 900. In other words, as long as the number of detection errors is between the low detection error threshold and the high detection error threshold, the amplitude MW and phase PW ranges remain unchanged.

The method described above in relation with FIG. 10 has advantages similar to those of the method described in relation with FIG. 8. One additional advantage of the method described above in relation with FIG. 10 is related to the fact that it is possible to take advantage of the counter 806 (FIG. 9) to perform energy consumption estimates after each expiration of the duration set by the counter 802 (FIG. 9). As an example, it is for example possible to estimate the consumption of the device 100A in particular from the number of activations of the confirmation mode 250, stored by the counter 804 in this example, and the number of bursts 806, stored by the counter 806 in this example, during the duration set by the counter 802.

In the preceding disclosure, the example has been used of high and low states, respectively, which, in a variant, can be reversed depending on the reset states of the various circuits by adapting certain signals if necessary (for example, by reversing the outputs of the latches). Such an adaptation is within the capabilities of one skilled in the art.

According to one embodiment, the device 100A includes a processing unit (a microprocessor) and a computer program product, including a non-transitory storage medium comprising instructions configured to implement all or part of the methods described above in relation with FIGS. 6, 8 and 10.

Figure 11:
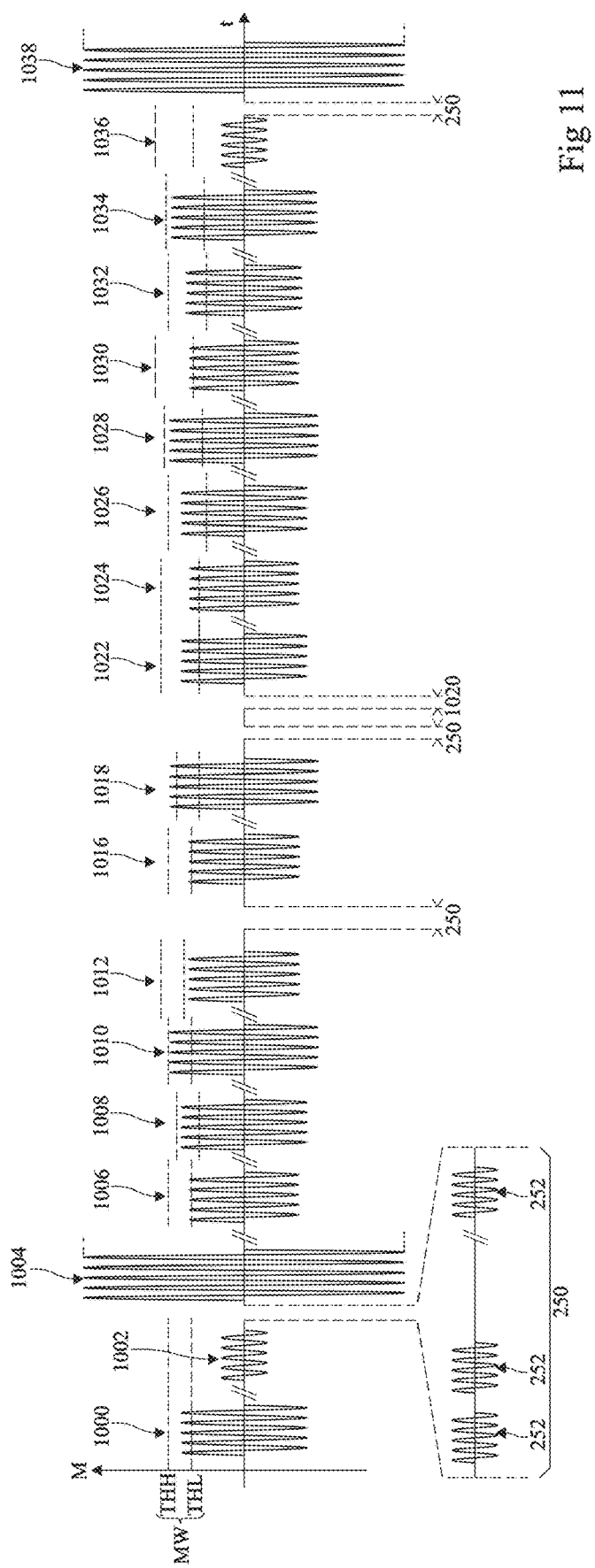
FIG. 11 is an exemplary timing diagram illustrating the implementation of the methods described in relation with FIGS. 6, 8 and 10.

FIG. 11 is an exemplary timing diagram illustrating the implementation of the methods described in relation with FIGS. 6, 8 and 10. The timing diagram of FIG. 11 more particularly illustrates the evolution, as a function of time t (on the x-axis), of the amplitude M (on the y-axis) of the signals across the terminals of the antenna 302 (FIG. 4) of the device 100A (FIG. 1).

In the illustrated example, it is assumed that a first burst 1000, similar to the bursts 200 of FIG. 3 and the amplitude of which is within the range MW of amplitudes, is emitted by the device 100A (FIG. 1) in standby mode.

It is next assumed that the NFC device 100B (FIG. 1) is placed in the field of the NFC device 100A. This results, in this example, in an amplitude drop of a burst 1002 after the burst 1000. The burst 1002 is for example similar to the burst 200' of FIG. 3. In the illustrated example, the amplitude of the burst 1002 leaves the range MW of amplitudes. At the end of the estimate of the mean value of the amplitude of the bursts 252 of the confirmation mode 250, it is assumed that the emitting device 100A switches to the active mode, that is to say it is removed from standby mode, and emits normally (emission 1004).

Once the emission 1004 is complete, the device 100A is returned to standby mode and starts to emit bursts again that are similar to the bursts 200 of FIG. 3. More specifically, in the illustrated example, the device 100A emits other successive bursts 1006, 1008 and 1010, after the emission 1004, the amplitudes of which are all within the range MW.

According to one embodiment, during periodic field emission bursts by the first device 100A, the range MW of amplitudes is offset, without scope modification, based on results obtained during one or several preceding bursts. The offset of the range MW is for example defined by levels measured during at least one preceding burst in the absence of detection by the second device. The offset of the range MW is for example done according to one of the embodiments described in U.S. Pat. No. 10,505,592, which is incorporated by reference in its entirety.

In the illustrated example, at the instant of the emission of the burst 1008, the range MW is offset based on the amplitude of the preceding burst 1006, for example centered relative to the amplitude of the burst 1006. Similarly, at the instant of the emission of the burst 1010, the range MW is offset based on the amplitude of the preceding burst 1008, for example centered relative to the amplitude of the burst 1008.

It is next presumed that a disturbance occurs during the emission of still another burst 1012, after the burst 1010, such that the amplitude of the burst 1012 leaves the range MW of amplitudes. At the end of the confirmation mode 250, it is then presumed that the emitting device 100A is kept in standby mode and starts to emit bursts again that are similar to the bursts 200 of FIG. 3. In other words, it is presumed that the device 100A commits a first detection error.

In the illustrated example, the device 100A emits yet another burst 1016, after the mode 250, the amplitude of which is within the range MW.

It is next presumed that another disturbance occurs during the emission of still another burst 1018, after the burst 1016 and, for example, separated from the burst 1016 by fewer than thirty-two bursts, such that the amplitude of the burst 1018 leaves the range MW of amplitudes. At the end of the confirmation mode 250, it is presumed here again that the emitting device 100A is kept in standby mode and starts to emit bursts again. In other words, it is presumed that the device 100A commits a second detection error.

The implementation of the methods described in relation with FIGS. 6, 8 and 10 then makes it possible to expand the range MW of amplitudes, due to a number of detection errors that is considered too high in this example.

In the illustrated example, the device 100A is taken out of standby mode during a step 1020.

The device 100A is next returned to standby mode and begins to emit bursts again. In the illustrated example, the device 100A emits other successive bursts 1022, 1024, 1026, 1028, 1030, 1032 and 1034, after the exit 1020 from standby mode, the amplitudes of which are all within the range MW.

In the illustrated example, the amplitude variation between the bursts 1028 and 1030, for example resulting from yet another disturbance, is presumed to be similar to the amplitude variation between the bursts 1010 and 1012. It is nevertheless observed that, in this example, the adjustment of the range MW at the end of the exit 1020 from standby mode allows the device 100A not to commit a false detection during the emission of the burst 1030, contrary to what occurred during the emission of the burst 1012.

Similarly, in the illustrated example, the amplitude variation between the bursts 1032 and 1034, for example resulting from yet another disturbance, is presumed to be similar to the amplitude variation between the bursts 1016 and 1018. It is observed here again that, in this example, the adjustment of the range MW allows the device 100A not to commit a false detection during the emission of the burst 1034, contrary to what occurred during the emission of the burst 1018.

It is then assumed that the NFC device 100B (FIG. 1) is placed in the field of the NFC device 100A. This results, in this example, in an amplitude drop of a burst 1036 after the burst 1034. In the illustrated example, the amplitude of the burst 1036 leaves the range MW of amplitudes. At the end of the confirmation mode 250, it is then assumed that the emitting device 100A has left standby mode and is emitting normally (emission 1038) in order to communicate with the device 100B. Once the emission 1038 is complete, the device 100A is returned to standby mode and starts to emit bursts again (not shown).

One advantage of the methods previously disclosed in relation to FIGS. 6, 8 and 10 lies in the fact that, in particular relative to the embodiments disclosed by document EP 3,495,986, the range MW of amplitudes can be expanded to avoid too many false detections. This proves useful, in particular, when the device 100A is placed in a highly disrupted environment, where the amplitude variations between consecutive bursts are too great to be able to be offset by the methods disclosed by U.S. Pat. No. 10,505,592. This more generally allows the device 100A to keep a good detection sensitivity of other NFC devices, but without being able to be disrupted by the environment.

Although this has not been shown in FIG. 11, another advantage of the methods disclosed in relation to FIGS. 6, 8 and 10 is related in the fact that, in particular relative to the embodiments disclosed by U.S. Pat. No. 10,505,592, the range MW of amplitudes can further be reduced to increase the detection sensitivity. This proves useful, in particular, when the device 100A is placed in an environment with few disruptions, where the amplitude variations between consecutive bursts are very small.

A timing diagram has previously been disclosed in relation with FIG. 11 in which the implementation of the methods of FIGS. 6, 8 and 10 is illustrated relative to an example of amplitude variations of the signal emitted by the device 100A. However, one skilled in the art is capable of transposing what has previously been disclosed to phase shift variations relative to the signal emitted by the device 100A.

Various embodiments and variants have been described. Those skilled in the art will understand that certain features of these embodiments can be combined and other variants will readily occur to those skilled in the art. In particular, those skilled in the art are capable of adapting the embodiments and modes of implementation previously disclosed to other embodiments and modes of implementation in which the levels of the binary signals are different from those indicated in the present disclosure.

Finally, the practical implementation of the described embodiments and variants is within the capabilities of those skilled in the art based on the functional description provided hereinabove. In particular, the values of the counters 406, 602, 802, 804 and 806 can be adapted by those skilled in the art based on the targeted application.

What is claimed is:

1. A method, comprising:
   transmitting, by a first near-field communication (NFC) device, a field emission burst;
   comparing a characteristic property of a signal of the field emission burst to a detection threshold, wherein the detection threshold comprises a first threshold and a second threshold delimiting a range of values of the characteristic property of the signal across terminals of an oscillating circuit of the first NFC device;
   determining a presence of a detection error based on the comparing, wherein the detection error comprises a false detection of a presence of a second NFC device, and the presence of the detection error is determined prior to an attempt by the first NFC device to communicate with the second NFC device; and
   adjusting the detection threshold based on a number of determined detection errors.

2. The method of claim 1, further comprising entering, by the first NFC device, a confirmation mode when the characteristic property is outside of the delimited range of values based on the comparing.

3. The method of claim 2, wherein the confirmation mode comprises:
   transmitting a first number of field emission bursts;
   counting a number of times the characteristic property of the signal is within the range of values to form a count value; and
   determining that the detection error has occurred when the count value exceeds a first predetermined number.

4. The method of claim 2, wherein the characteristic property corresponds to an amplitude of the signal across the terminals of the oscillating circuit of the first NFC device.

5. The method of claim 2, wherein the characteristic property corresponds to a phase shift of the signal across the terminals of the oscillating circuit of the first NFC device.

6. The method of claim 1, wherein the range of values is expanded when the number of determined detection errors is greater than a first value.

7. The method of claim 6, wherein the range of values is narrowed when the number of determined detection errors is less than a second value.

8. The method of claim 1, further comprising offsetting the range of values by a range offset without modifying a scope of the range of values, based on comparing the characteristic property to the detection threshold over a plurality of field transmission bursts.

9. The method of claim 8, further comprising determining the range offset based on a level of the characteristic property of the signal determined during at least one preceding burst in an absence of a detection of the second NFC device.

10. The method of claim 1, further comprising switching, by the first NFC device, to an operating mode for transmitting an NFC polling sequence when the second NFC device is detected based on the comparing the characteristic property of the signal to the detection threshold.

11. The method of claim 1, wherein the first NFC device has at least two operating modes, including a first mode in which field emission bursts are spaced apart by a duration corresponding to at least one hundred times a duration of the field emission bursts.

12. A near-field communication (NFC) device comprising:
   a NFC transmission circuit configured to transmit a field emission burst, wherein the NFC transmission circuit comprises an oscillator;

a measurement circuit coupled to the NFC transmission circuit, the measurement circuit comprising a comparator configured to compare a characteristic property of a signal of the field emission burst to a detection threshold, wherein
  the comparator comprises a first comparator configured to compare the characteristic property of the signal to a first threshold, and a second comparator configured to compare the characteristic property of the signal to a second threshold,
  the first threshold and the second threshold correspond to a range of values of the characteristic property, and
  the signal of the field emission burst comprises a signal across terminals of the oscillator; and
a detection circuit coupled to the measurement circuit, the detection circuit configured to
  determine a presence of a detection error based an output of the comparator, wherein the detection error comprises a false detection of a presence of a further NFC device, and the presence of the detection error is determined prior to an attempt by the NFC device to communicate with the further NFC device; and
  adjust the detection threshold based on a number of determined detection errors.

13. The NFC device of claim 12, wherein:
the detection circuit is configured to expand the range of values when the number of determined detection errors is greater than a first value; or
the detection circuit is configured to narrow the range of values when the number of determined detection errors is less than a second value.

14. The NFC device of claim 13, wherein the characteristic property comprises an amplitude or a phase shift.

15. The NFC device of claim 12, wherein the detection circuit is configured to cause the NFC device to enter a confirmation mode when the characteristic property is outside of the range of values, wherein, in the confirmation mode, the detection circuit is configured to cause the NFC device to:
  transmit a first number of field emission bursts;
  count a number of times the characteristic property of the signal is within the range of values to form a count value; and
  determine that the detection error has occurred when the count value exceeds a first predetermined number.

16. The NFC device of claim 12, wherein the NFC transmission circuit is configured transmit an NFC polling sequence when the further NFC device is detected based on the output of the comparator.

17. A non-transitory machine readable medium having stored thereon a program having a program code for performing, when the program is executed on at least one processor, the following steps:
  causing a near-field communication (NFC) device to transmit a field emission burst;
  receiving a result of a comparison of a characteristic property of a signal of the field emission burst to a detection threshold;
  determining a presence of a detection error based on the result of the comparison, wherein the detection error comprises a false detection of a presence of a further NFC device, and the presence of the detection error is determined prior to an attempt by the NFC device to communicate with the further NFC device; and
  adjusting the detection threshold based on a number of determined detection errors, wherein the detection threshold comprises a first threshold and a second threshold delimiting a range of values of the characteristic property of the signal across terminals of an oscillating circuit of the NFC device.

18. The non-transitory machine readable medium of claim 17, wherein the program code further includes instructions for:
  entering a confirmation mode when the characteristic property is outside of the delimited range of values based on the result of the comparison; and
  in the confirmation mode:
    causing the NFC device to transmit a first number of field emission bursts;
    counting a number of times the characteristic property of the signal is within the range of values to form a count value; and
    determining that the detection error has occurred when the count value exceeds a first predetermined number.

19. The non-transitory machine readable medium of claim 17, wherein the characteristic property of the signal comprises a phase shift or an amplitude.

20. The non-transitory machine readable medium of claim 17, wherein:
  the range of values is expanded when the number of determined detection errors is greater than a first value; and
  the range of values is narrowed when the number of determined detection errors is less than a second value.

* * * * *